Patented Dec. 18, 1951

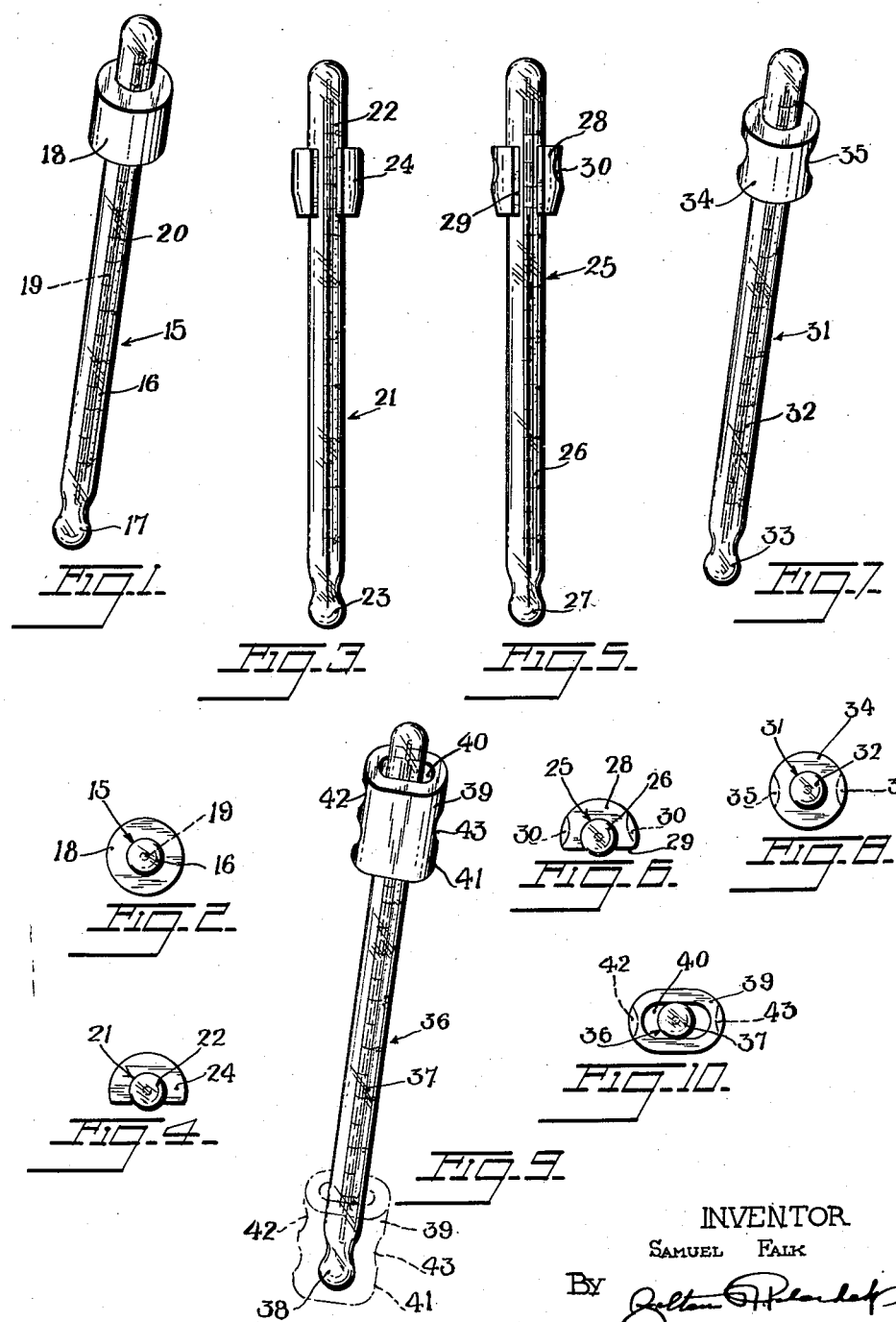

2,579,376

UNITED STATES PATENT OFFICE 2,579,376

RESILIENT FINGER GRIP FOR THERMOMETERS

Samuel Falk, Elmhurst, N. Y.

Application June 29, 1946, Serial No. 680,405

2 Claims. (Cl. 73—373)

This invention relates to thermometers and more specifically to plastic thermometers.

The object of the present invention is the construction of an all-plastic thermometer which because plastic is used in its construction, is unbreakable when dropped, and which cannot accidentally break when placed in the mouth or rectum.

The invention is characterized by forming a thermometer of a transparent plastic material and providing a finger grip. An object of the invention is to form a transparent plastic thermometer with a finger gripping means to permit an easy grasping of the instrument and lessen the chances of dropping it.

Another object is to form the thermometer with a finger grip which can be used as a guard to protect the bulb.

A further object is to form the instrument inexpensively and simply but to equip it with elements which protect it from mishaps, and provide a cover for its bulb when the instrument is not in use.

These and other objects are accomplished by forming the thermometer of a transparent plastic material and shaping it with a flange having a pair of opposing finger grips on its outer side surface.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a transparent plastic thermometer embodying the invention.

Fig. 2 is a top view of the thermometer shown in Fig. 1.

Fig. 3 is a front view of a thermometer containing a modification of the invention.

Fig. 4 is a top view of the thermometer shown in Fig. 3.

Fig. 5 is a front view of a thermometer containing another modification of the invention.

Fig. 6 is a top view of the thermometer shown in Fig. 5.

Fig. 7 is a perspective view of a thermometer containing a further modification of the invention.

Fig. 8 is a top view of the thermometer shown in Fig. 7.

Fig. 9 is a perspective view of a thermometer containing another modification of the invention.

Fig. 10 is a top view of the thermometer shown in Fig. 9.

In the drawings and in the specification, in which the same numbers indicate similar elements, a transparent plastic thermometer 15, shown in Figs. 1 and 2 is comprised of a tube 16, bulb 17 and a flange 18. The tube 16 has a bore 19 suitable for containing an expandible fluid such as is used as an indicator in a thermometer with its length marked off, or graduated by transverse lines 20 indicating various temperatures.

The bulb 17 is formed at one end of the tube and its mouth opens into the bore of the tube and it is suitable for containing the required amount of thermometric fluid necessary to properly function within the tube.

The flange 18 is positioned on the tube at its end removed from the bulb. The flange extends completely around the tube and is of a substantial size in the direction of the axis of the tube and cross section normal to the axis, and acts as a gripping means by which the thermometer may be easily and safely held.

In a variation of the invention shown in Figs. 3 and 4, a thermometer 21 is comprised of a thermometer tube 22, bulb 23 and a collar 24. The thermometer tube 22 and bulb 23 are similar to the tube 16 and bulb 17 of Fig. 1. The collar 24 extends about more than half the circumference of the tube and fits slidably, though quite securely to it, the open part of the collar permitting the liquid and graduations to be observed.

In a further variation of the invention shown in Figs. 5 and 6, a thermometer 25 is comprised of a tube 26, bulb 27 and collar 28. The thermometer tube and bulb resemble the tube 16 and bulb 17 of Fig. 1. The collar 28, like the collar 24, extends partially but about the tube and grips it securely. The collar at the sides of its opening 29 is provided with indentations 30 suitable for being used as finger grips.

In a variation of the invention shown in Figs. 7 and 8 a thermometer 31 is provided with a tube 32, bulb 33, and collar or flange 34, the tube and bulb being similar to the tube 16 and bulb 17 of Fig. 1. The collar or flange 34 fits closely enough about the tube 32 to grip it and prevent relative movement unless force is applied. The collar is provided with the finger grip holes 35.

In a variation of the invention shown in Figs. 9 and 10, a plastic thermometer 36 is provided with a tube 37, bulb 38, and collar 17 of Fig. 1. The collar 39 is oval in cross section and has a bore 40, also oval in cross section. The distance across the short axis of the oval being the same as the diameter of the tube, so that the collar holds on the tube. The material of the collar is resilient and flexible enough so that when the collar is squeezed along the long axis of the oval, the short axial distance of the bore increases and permits the collar to be slid along the tube. The collar has a length of height 41 considerably greater than the length of the bulb so that it can be slid over the bulb and well up on the tube and act as a protection against the breaking of the bulb at its neck (see phantom of collar Fig. 10). The collar 39 is provided, also, with a pair of finger grip indentations 42 at the left and a single thumb grip indentation 43 at the right of the tube.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A thermometer comprised of a plastic tube, bulb and a collar, the tube having graduated marks thereacross suitable for indicating temperature, the bulb joined to the tube at one end and the collar being formed of resilient material having an ovate circumference and bore the length of the shorter diameter of the bore being slightly smaller than the diameter of the tube whereby the collar can rest securely on the tube and be slidably moved thereon when the collar is squeezed in the direction of its longer oval bore diameter.

2. A thermometer comprised of a plastic tube, bulb and a collar, the tube having graduated marks thereacross suitable for indicating temperatures, the bulb joined to the tube at one end and the collar being formed of resilient material having an ovate circumference and bore, the length of the shorter diameter of the bore being slightly smaller than the diameter of the tube and said collar having two finger gripping indentations on its left one side one above the other and one finger gripping indentation on its other side, all three indentations being along the longest bore diameter of the collar whereby the collar can rest securely on the tube and be slidably moved thereon when the collar is squeezed by fingers engaged in the indentations.

SAMUEL FALK.

REFERENCES CITED

The following references are of record in the file of this patent:

UNITED STATES PATENTS

| Number | Name | Date |
|---|---|---|
| 848,458 | Grafton | Mar. 26, 1907 |
| 1,833,184 | Schneider | Nov. 24, 1931 |
| 1,896,503 | Addis | Feb. 7, 1933 |
| 1,999,427 | Thoren | Apr. 30, 1935 |
| 2,084,875 | Thoren | June 22, 1937 |

FOREIGN PATENTS

| Number | Country | Date |
|---|---|---|
| 217,793 | Great Britain | June 26, 1924 |